US010042416B2

(12) United States Patent
Tzafrir et al.

(10) Patent No.: US 10,042,416 B2
(45) Date of Patent: Aug. 7, 2018

(54) MEMORY SYSTEM AND METHOD FOR ADAPTIVE AUTO-SLEEP AND BACKGROUND OPERATIONS

(71) Applicant: SanDisk Technologies Inc., Plano, TX (US)

(72) Inventors: Yonatan Tzafrir, Petah Tikva (IL); Hannon Aharon Borukhov, Rehovot (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/803,732

(22) Filed: Jul. 20, 2015

(65) Prior Publication Data

US 2017/0024002 A1    Jan. 26, 2017

(51) Int. Cl.
*G06F 1/32* (2006.01)

(52) U.S. Cl.
CPC .......... *G06F 1/3296* (2013.01); *G06F 1/3225* (2013.01); *G06F 1/3228* (2013.01); *G06F 1/3275* (2013.01); *Y02D 10/14* (2018.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | | |
|---|---|---|---|---|
| 5,691,948 A | * | 11/1997 | Sakabe | G11B 19/06 365/226 |
| 7,383,457 B1 | * | 6/2008 | Knight | G06F 1/32 713/320 |
| 9,405,344 B1 | * | 8/2016 | Rosen | G06F 1/3287 |
| 2005/0198542 A1 | | 9/2005 | Freker et al. | |
| 2006/0259791 A1 | * | 11/2006 | Dockser | G06F 1/3228 713/300 |
| 2012/0151238 A1 | | 6/2012 | Yang | |
| 2012/0159209 A1 | | 6/2012 | Stemen et al. | |
| 2013/0290758 A1 | * | 10/2013 | Quick | G06F 1/3203 713/323 |

(Continued)

FOREIGN PATENT DOCUMENTS

WO    WO 2010/080172 A1    7/2010

OTHER PUBLICATIONS

International Search Report and Written Opinion in corresponding International Application No. PCT/US2016/036354, dated Sep. 5, 2016, 13 pages.

(Continued)

*Primary Examiner* — Zahid Choudhury
(74) *Attorney, Agent, or Firm* — Brinks Gilson & Lione

(57) ABSTRACT

A memory system and method are provided for adaptive auto-sleep and background operations. In one embodiment, a controller of a memory system measures an amount of time between when the memory completes an operation and when the controller receives a command to perform another operation in the memory. The controller adjusts a time period after which the controller enters an auto-sleep mode and/or starts a background operation based on the measured amount of time. Other embodiments are disclosed.

23 Claims, 6 Drawing Sheets

(56) References Cited

U.S. PATENT DOCUMENTS

2014/0269127 A1* 9/2014 Hung .................... G11O 5/145
  365/203
2015/0121106 A1* 4/2015 Eckert .................. G06F 1/3228
  713/323

OTHER PUBLICATIONS

U.S. Appl. No. 15/465,367, filed Mar. 21, 2017, Navon et al.
U.S. Appl. No. 15/911,815, filed Mar. 5, 2018, Hahn et al.

* cited by examiner

MEMORY SYSTEM AND METHOD FOR ADAPTIVE AUTO-SLEEP AND BACKGROUND OPERATIONS

BACKGROUND

Some memory systems with non-volatile memories (such as flash memory) have an auto-sleep function. Typically, the controller of such a memory system is programmed with a predetermined time threshold, and if the memory has been idle for longer than the predetermined time threshold (e.g., due to inactivity of a host), the controller places the memory system in an auto-sleep mode to reduce the current and power consumed by the memory system. Before the memory system is put to sleep, the controller typically performs various tasks to prepare for sleep mode, such as saving user and management data from volatile memory to non-volatile memory and powering off hardware components. When the controller senses a new command from the host, the controller typically performs various tasks to exit from sleep mode, such as copying user and management data from non-volatile memory to volatile memory and powering on hardware components.

DETAILED DESCRIPTION

Figure 1:
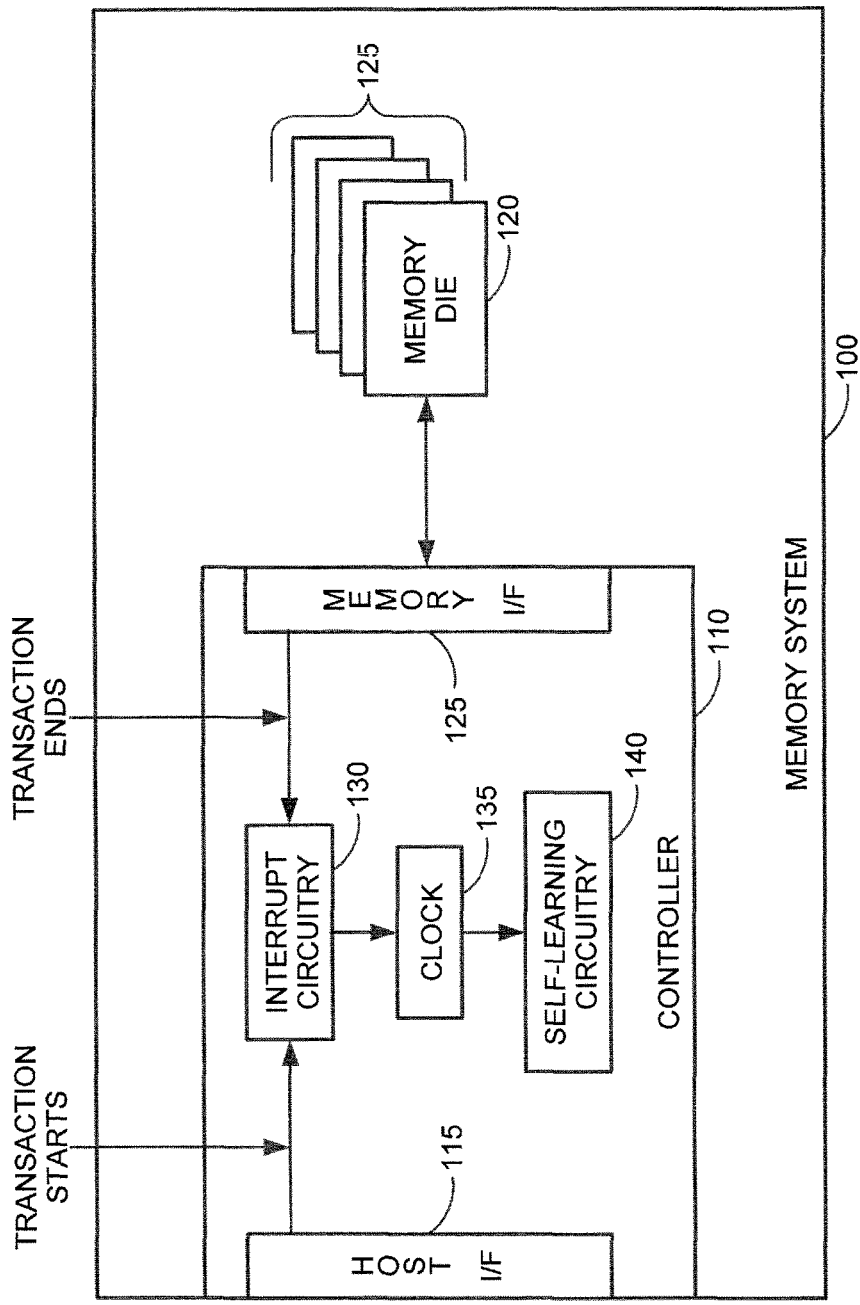
FIG. 1 is a block diagram of an exemplary memory system of an embodiment.

By way of introduction, the below embodiments relate to a memory system and method for adaptive auto-sleep and background operations is provided. In one embodiment, a controller of a memory system measures an amount of time between when the memory completes an operation and when the controller receives a command to perform another operation in the memory. The controller adjusts a time period after which the controller enters an auto-sleep mode based on the measured amount of time.

In some embodiments, the time period is adjusted based on the measured amount of time and on at least one additional amount of time for at least one additional operation.

In some embodiments, the time period can be reduced when the measured amount of time is less than the time period, while, in other embodiments, the time period is reduced when the measured amount of time is less than a sum of the time period and a time it takes the controller to enter and exit the auto-sleep mode.

In some embodiments, the time period is increased when the measured amount of time is greater than the time period, while, in other embodiments, the time period is increased when the measured amount of time is greater than a sum of the time period and a time it takes the controller to enter and exit the auto-sleep mode.

In some embodiments, the controller measures the amount of time by measuring time between when the controller receives an end signal via a memory interface and when the controller received a start signal via a host interface.

In another embodiment, a memory system is disclosed having a memory and a controller. The controller is configured to measure idle time of the memory and determine if the measured idle time of the memory is less than or greater than an auto-sleep threshold. In response to determining that the measured idle time is less than the auto-sleep threshold, the controller decreases the auto-sleep threshold. In response to determining that the measured idle time is greater than the auto-sleep threshold, the controller increases the auto-sleep threshold.

In some embodiments, the controller is configured to measure idle time by measuring an amount of time between when the controller completes an operation in the memory and when the controller receives a command to perform another operation in the memory.

In some embodiments, the controller is configured to measure the amount of time by measuring time between when the controller receives an end signal via a memory interface and when the controller received a start signal via a host interface.

In some embodiments, the controller is configured to use a plurality of measured idle times to determine if the auto-sleep threshold should be increased or decreased.

In some embodiments, the auto-sleep threshold includes a time it takes the controller to enter and exit the auto-sleep mode.

In some embodiments, the controller is configured to measure idle time using interrupt circuitry and a clock, and the controller is further configured to determine if the measured idle time of the controller is less than or greater than the auto-sleep threshold using self-learning circuitry.

In another embodiment, the above method and/or memory system is used to performing adaptive background operations, in addition to or instead of performing adaptive auto-sleep.

In some embodiments, the memory is a three-dimensional memory.

In some embodiments, the memory system is embedded in a host, while, in other embodiments, the memory system is removably connected to a host.

Other embodiments are possible, and each of the embodiments can be used alone or together in combination.

As mentioned above, these embodiments generally relate to a memory system and method for adaptive auto-sleep and background operations. Before turning to several examples, the follow paragraphs present an exemplary memory system that can be used with these embodiments.

Turning now to the drawings, FIG. 1 is a block diagram of a memory system 100 of an embodiment. As shown in FIG. 1, the memory system 100 of this embodiment comprises a controller 110 in communication with a memory die 120. As used herein, the phrase "in communication with" could mean directly in communication with or indirectly in communication with through one or more components, which may or may not be shown or described herein.

In general, the controller 110 transmits command sequences for read, program, and erase operations to the memory die 120, and performs other functions, as will be discussed below. The controller 110 can be implemented in any suitable manner. For example, the controller 110 can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 110 can be configured with hardware and/or firmware to perform the various functions described below and shown in the flow diagrams. Also, some of the components shown as being internal to the controller 110 can also be stored external to the controller 110, and other components can be used.

In some embodiments, the memory system 100 comprises a single memory die 120, while, in other embodiments, the memory system 100 comprises at least one additional memory die 125. As used herein, the term "die" refers to the collection of non-volatile memory cells, and associated circuitry for managing the physical operation of those non-volatile memory cells, that are formed on a single semiconductor substrate. A memory die may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

As shown in FIG. 1, in one embodiment, the memory system's controller 110 comprises a host interface (or host interface module (HIM)) 115, a memory (or backend) interface 125, interrupt circuitry 130, a clock 135, and self-learning circuitry 140. The controller 110 can contain other components as well, such as, but not limited to, random access memory (RAM), read only memory (ROM) (e.g., to store system boot code), an error correction controller (ECC) engine to encode/decode data written to and read from the memory die 120, and a crypto-engine to provide encryption and/or decryption operations.

The host interface 115 can take any suitable form, such as, but are not limited to, a SATA, SATA Express, SAS, Fibre Channel, USB, PCIe, and NVMe interface. The memory interface 125 can also take any suitable form, such as, but not limited to, a flash interface (e.g., Toggle Mode 200, 400, or 800). The interrupt circuitry 130, which takes the form of a programmable hardware block in one embodiment, is configured to receive interrupts from multiple interrupt sources on every change associated with data of a serviced command. For example, the interrupts can be host interrupts that are received via the host interface 115 and/or interrupts received from the memory 120 via the memory interface 125. In one embodiment, the host interface 115 receives commands from the host and provides a transaction start signal as an interrupt to the interrupt circuitry 130 in response to receiving every new command. Similarly, the memory interface 125 receives a transaction end (end-of-operation (EOP)) signal from the memory 120 with every completion of a transaction in the memory 120.

In this embodiment, when the interrupt circuitry 130 receives a transaction end signal from the memory interface 125, the interrupt circuitry 130 activates the clock 135 (which can be a hardware component that serves as a real time or non-real time clock). The interrupt circuitry 130 stops the clock 135 in response to receiving the transaction start signal from the host interface 115. In this way, the clock 135 measures the amount of time between when the memory 120 completes an operation to when the controller 110 receives a command to perform another operation in the memory 120. This measured time is then provided to the self-learning circuitry 140, which uses this measured time to adjust an auto-sleep threshold (i.e., a time period after which the controller 110 enters an auto-sleep mode), which will be discussed in more detail below.

As used herein, the term "circuitry" can refer to an instruction processor, such as a Central Processing Unit (CPU), microcontroller, or a microprocessor; or an Application Specific Integrated Circuit (ASIC), Programmable Logic Device (PLD), or Field Programmable Gate Array (FPGA); or a collection of discrete logic or other circuit components, including analog circuit components, digital circuit components or both; or any combination thereof. Circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, "circuitry" may store or access instructions for execution or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs and part of a library, such as a shared library like a Dynamic Link Library (DLL). The library, for example, may contain shared data and one or more shared programs that include instructions that perform any of the processing described above or illustrated in the drawings, when executed by the circuitry. Accordingly, "circuitry" may be implemented in many different ways and in many different combinations of hardware and software.

The memory system 100 can take any suitable form. For example, the memory system 100 can be a removable mass storage device, such as, but not limited to, a handheld, removable memory device, such as a memory card (e.g., a Secure Digital (SD) card, a micro Secure Digital (micro-SD)

card, or a MultiMedia Card (MMC)), or a universal serial bus (USB) device. The memory system 100 can also take the form of an embedded mass storage device, such as an eSD/eMMC embedded flash drive or an embedded or removable solid state drive (SSD) found in, for example, portable computing devices, such as laptop computers, and tablet computers.

Figure 2A:
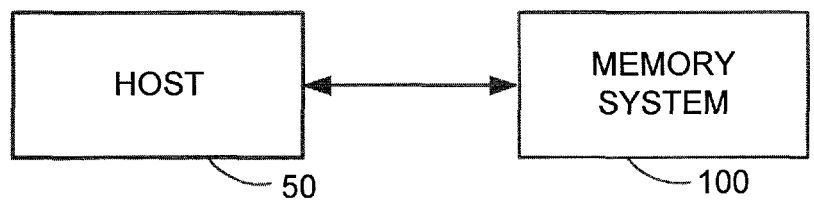
FIG. 2A is a block diagram of a memory system of an embodiment removably connected to a host.
Figure 2B:
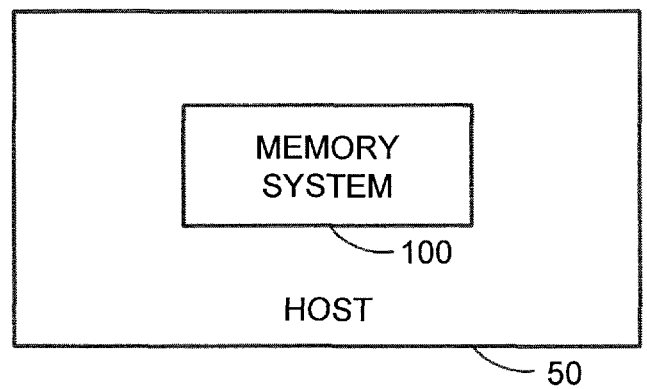
FIG. 2B is a block diagram of a memory system of an embodiment embedded in a host.

As shown in FIG. 2A, in some embodiments, the memory system 100 is removably connected to a host 50 (e.g., where the host 50 and memory system 100 can each have mating physical connectors that allow the memory system 100 to be removably connected to the host 50). In other embodiments (shown in FIG. 2B), the memory system 100 is embedded in a host 50 (FIG. 2B).

A host can take any suitable form. A host 50 typically has a controller and an interface for communicating with the memory system 100. In some implementations, the host 50 has a crypto-engine operative to provide encryption and/or decryption operations for communication with the memory system 100 (e.g., for mutual authentication, key exchange, and establishment of a secure channel). The host 50 can contain other components (e.g., a display device, a speaker, a headphone jack, a video output connection, etc.). Examples of hosts 50 include, but are not limited to, a mobile phone, a digital media player, a game device, a personal digital assistant (PDA), a personal computer (PC), a kiosk, a set-top box, a TV system, a book reader, or any combination thereof.

As mentioned in the background section above, some memory systems have an auto-sleep function to reduce the current and power consumed by the memory system when not in use. Typically, the controller of such a memory system is programmed with a predetermined time threshold, and if the memory has been idle for longer than the predetermined time threshold (e.g., due to inactivity of a host), the controller places the memory system in an auto-sleep mode. Before the memory system is put to sleep, the controller typically performs various tasks to prepare for sleep mode, such as saving user and management data from volatile memory to non-volatile memory, powering off hardware components (e.g., hardware cores and volatile memories inside the controller) and latching logic or hardware cores. When the controller senses a new command from the host that requires a memory operation, the controller typically performs various tasks to exit from sleep mode, such as copying user and management data from non-volatile memory to volatile memory, powering on hardware components, and unlatching logic or hardware cores. The time it takes for the controller to exit auto-sleep mode will be referred to herein as "t1," and the time it takes for the controller to enter auto-sleep mode will be referred to herein as "t2."

The controller starts the auto-sleep process after measuring a time T of no memory activity, e.g., due to inactivity of a host. However, host processors vary in their behavior during idle (no-activity) time based on the type, brand, and model of the host processor. Also, even the same host processor can change its behavior (e.g., bus speed, bus bits width, single data rate vs. double data rate, etc.) depending on the mode in which it operates and the main task it is performing (e.g., sequential vs. random activity, write vs. read vs. erase, size of data chunk, etc.). This results in idle time and frequency that varies from one device controller to the other. As such, using a constant (fixed) time T against which to measure idle time of the memory can lead to non-ideal behavior, as a given time T may be too short in some situations and too long in others. If T is fixed at a time that is too short, the controller will enter auto-sleep too frequently, incurring the time penalty of t1 and t2 too often, thereby degrading the speed and performance of the memory system. This can occur, for example, when the host is frequently stopping its activity after T+Δt time, where Δt<<T, and then going back to activity right afterwards. Likewise, if T is fixed at a time that is too long, the controller will not enter auto-sleep frequently enough, which means that the memory system is consuming more current and power than it needs to.

To address this situation, the following embodiments can be used to provide an adaptive auto-sleep mode. Instead of using a constant time T against which to measure the idle time of the memory 120, an adjustable time period can be used. More specifically, the time T in which the controller 110 enters auto-sleep mode is adaptive and dynamically self-adjusted in an optimal manner based on the actual operation of the controller 110. This allows for optimizing operation of the controller 110 in sleep mode in a dynamic manner, thereby improving overall system performance and achieving less power consumption.

Figure 3:
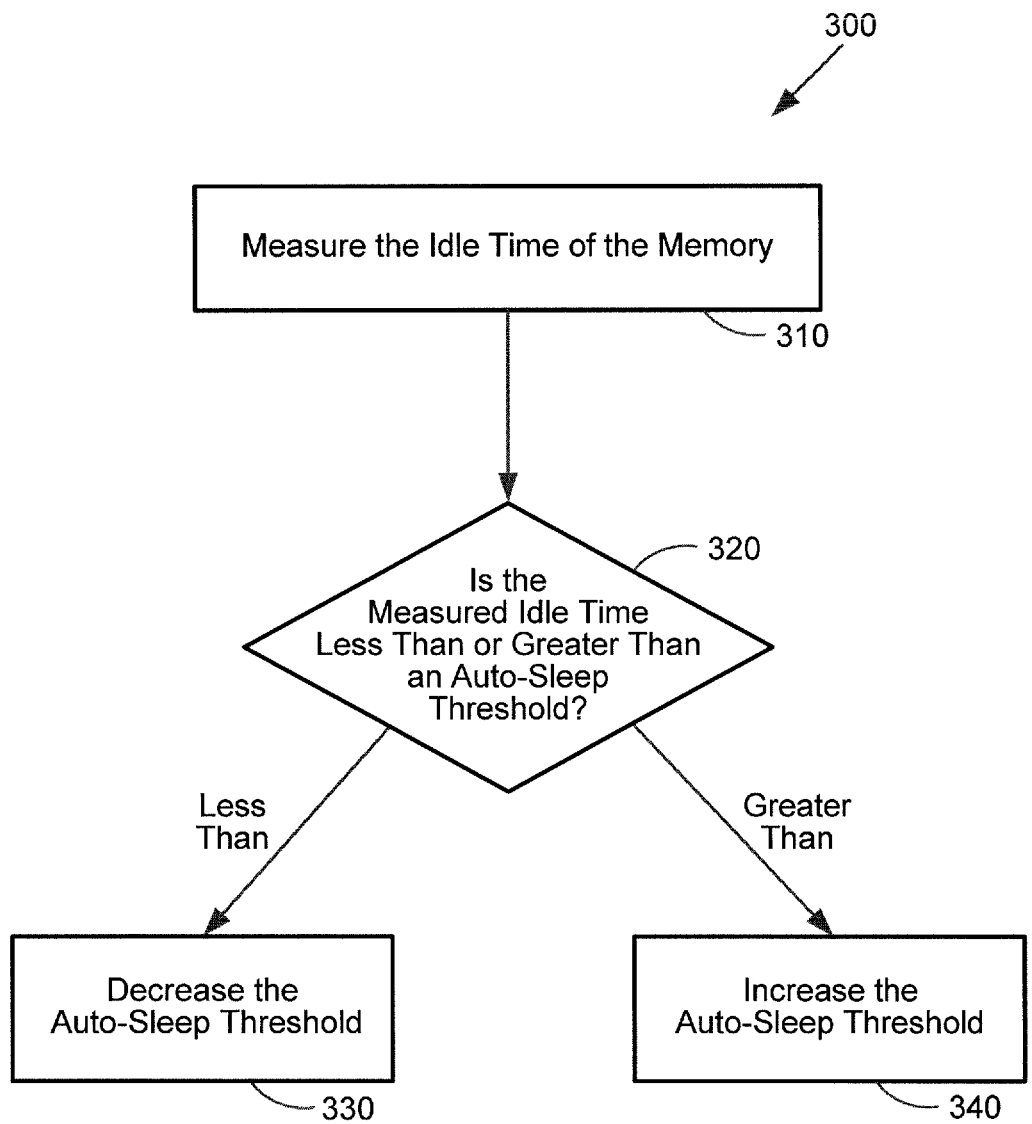
FIG. 3 is a flow chart of a method of an embodiment for adaptive auto-sleep.

Turning again to the drawings, FIG. 3 is a flow chart 300 that illustrates this embodiment. As shown in FIG. 3, the controller 110 measures the idle time of the memory (act 310). Next, the controller 110 determines if the measured idle is less than or greater than an auto-sleep threshold (act 320). In response to determining that the measured idle time is less than the auto-sleep threshold, the controller 110 decreases the auto-sleep threshold (act 330). In response to determining that the measured idle time is greater than the auto-sleep threshold, the controller 110 increases the auto-sleep threshold (act 340). In this way, the controller 110 can reduce the time period when the measured amount of time is less than the auto-sleep threshold (time period T), or less than T plus t1 and t2. That is, if the memory 120 is idle less than the time period T (or less than T plus t1 and t2), the controller 110 can reduce the time period T, which would cause the memory system 100 to go to sleep more frequently. Conversely, the controller 110 can increase the time period when the measured amount of time is more than the time period T (or more than T plus t1 and t2). Of course, other algorithms can be used, e.g., depending on the need of the memory system 100 for performance and power optimization.

Measuring the idle time and dynamically self-adjusting the time period T after which the controller 110 enters an auto-sleep mode can be performed in any suitable way. For example, in one embodiment, idle time is measured as the amount of time between when the memory 120 completes an operation and when the controller 110 receives a command to perform another operation in the memory 120.

Figure 4:
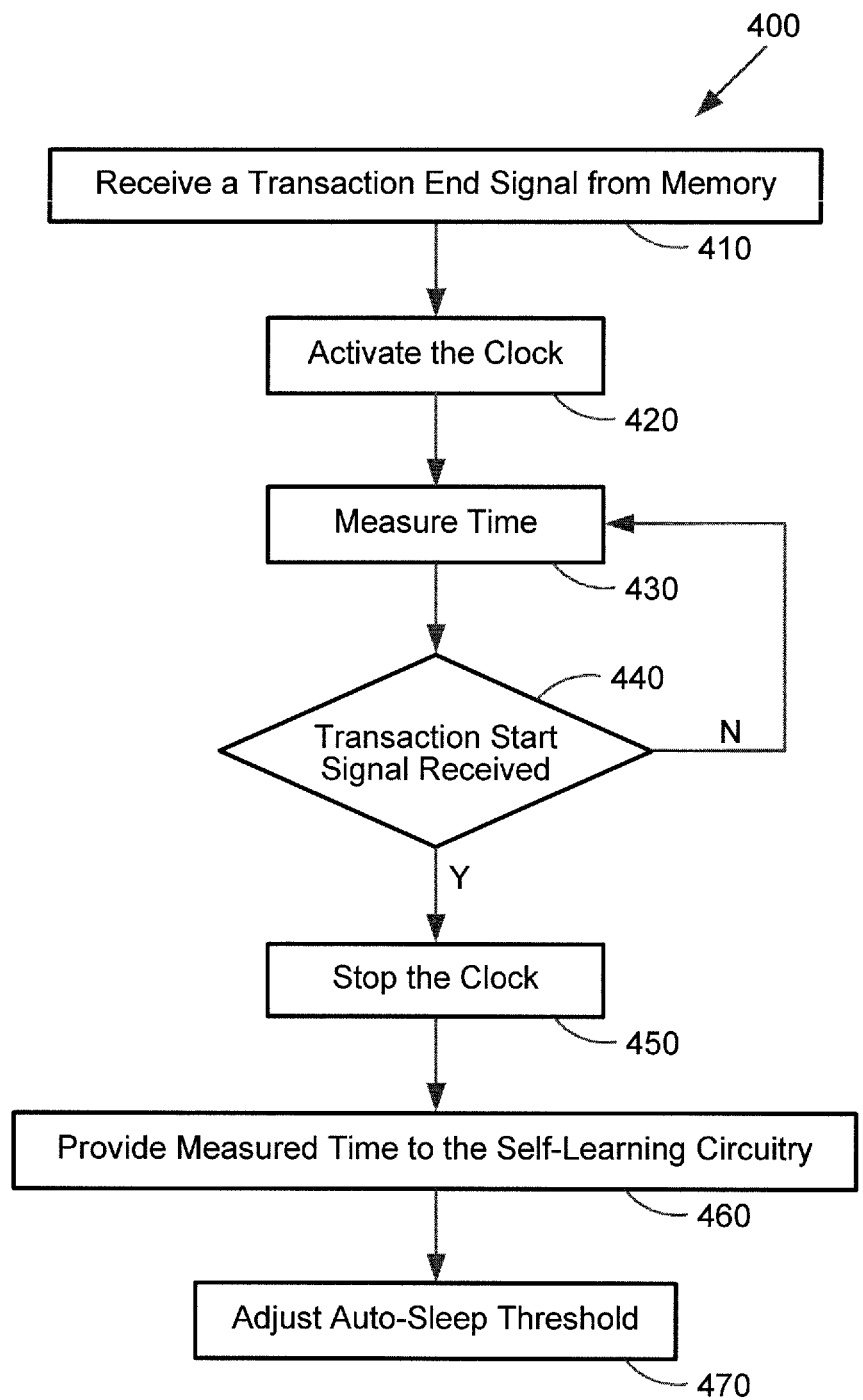
FIG. 4 is a flow chart of a method of an embodiment for adaptive auto-sleep using interrupt and self-learning circuitry.

In one exemplary implementation, the components in FIG. 1 are used, and FIG. 4 is a flowchart 400 that illustrates the use of those components. As shown in FIG. 1, interrupt circuitry 130 is configured to receive a host interrupt via the host interface 115 and an interrupt from the memory 120 via the memory interface 125. In one embodiment, the host interface 115 receives commands from the host and provides a transaction start signal as an interrupt to the interrupt circuitry 130 in response to receiving every new command. (An interrupt from the host 50 can also prompt the controller 110 to exit sleep mode.) Similarly, the memory interface 125 receives a transaction end (end-of-operation (EOP)) signal from the memory 120 with every completion of a transaction in the memory 120.

As shown in FIG. 4, in this embodiment, when the interrupt circuitry 130 receives a transaction end signal from the memory interface 125 (act 410), the interrupt circuitry 130 activates the clock 135 (act 420), which can be a hardware component that serves as a real time or non-real time clock. The clock measures time (act 430), and the controller 1100 determines if a transaction start signal is received from a host (act 440). If the transaction start signal is received, the interrupt circuitry 130 stops the clock 135 (act 450). In this way, the clock 135 measures the amount of time between when the memory 120 completes an operation to when the controller 110 receives a command to perform another operation in the memory 120.

This measured time is then provided to the self-learning circuitry 140 (act 460), which uses this measured time to adjust an auto-sleep threshold (i.e., a time period T after which the controller 110 enters an auto-sleep mode based on the measured amount of time) (act 470). The self-learning circuitry 140 can make these adjustments after the completion of every transaction (associated with one or more commands) or after a threshold (e.g., after N transactions). Also, the controller 110 can periodically or occasionally initiate a self-adjusting process associated with the operation of the controller 110 for adjusting (increasing or decreasing) the time period T based on input from the self-learning circuitry 140. Accordingly, self-adjusting may be performed by the controller 110 in a dynamic manner. Also, the self-learning circuitry 140 can be used only when the memory system 100 is in a certain mode. In this way, the adaptive changing of the auto-sleep threshold can be performed only some of the time.

Figure 5:
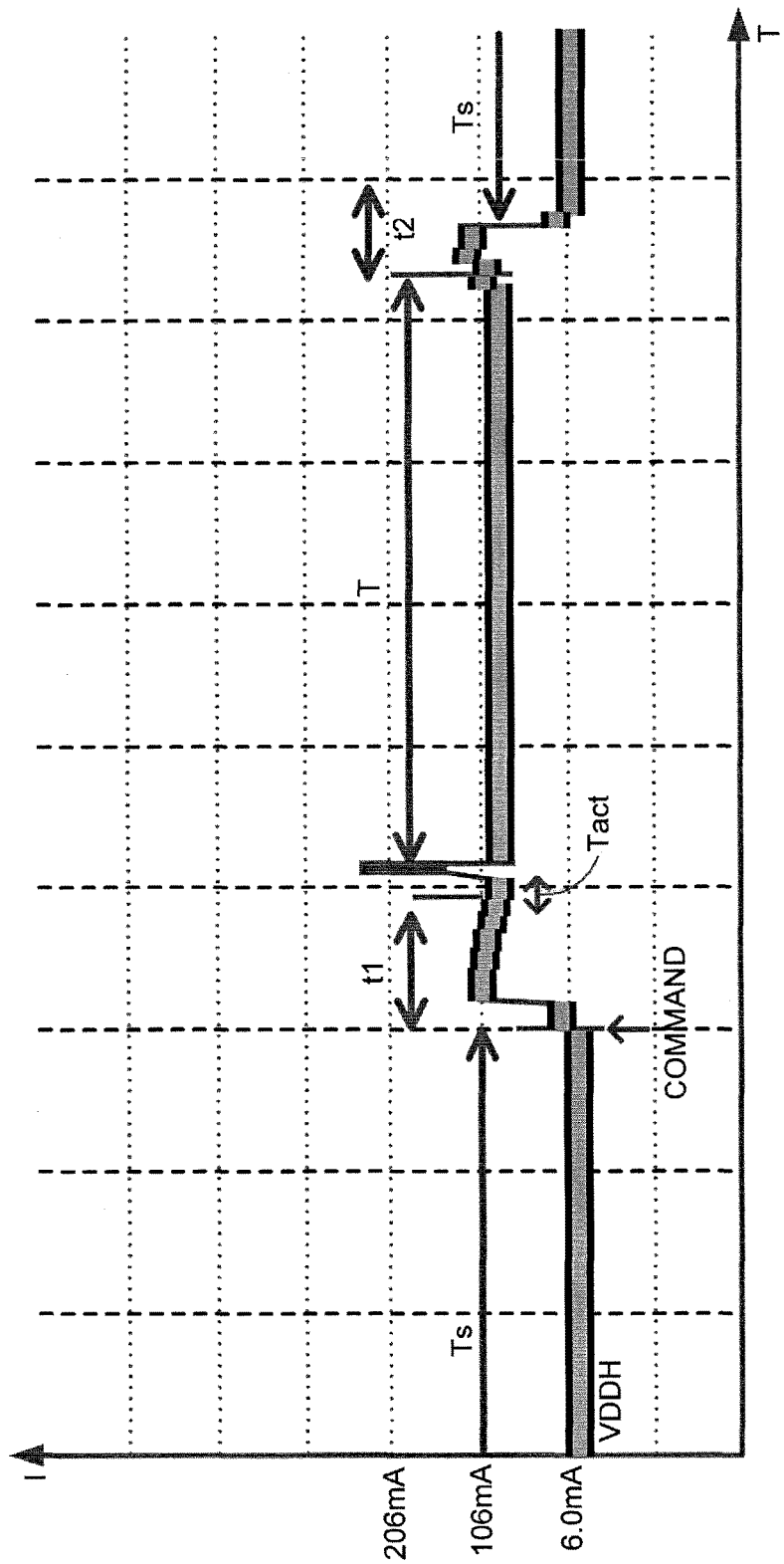
FIG. 5 is a graph illustrating adaptive auto-sleep of an embodiment.

FIG. 5 is a graph that illustrates this embodiment. FIG. 5 is a graph of current consumed by the memory device 100 versus time. As shown in FIG. 5, when the memory device 100 is in sleep mode (during time Ts), the memory device 100 is consuming a relatively-low level of current (in this example, 6.0 mA). When the memory device 100 receives a command from a host (e.g., when the controller 110 receives a transaction start signal), the memory device 100 spends t1 time coming out of sleep mode and Tact time performing the command. When the memory device 100 is out of auto-sleep mode, it consumes a relatively-higher level of current (in this example, 106 mA). The controller 110 then waits for T time to pass before putting the memory device 100 back into auto-sleep mode, which requires t2 time.

In this embodiment, the self-learning circuitry 140 in the controller 110 monitors the actual time that passes since the controller 110 completed the last operation for an existing command and until receiving an indication for a new request. The time since the controller 110 completes the operation for an existing command until it receives an indication from the host for a new request is represented as Td=Ts+t2+Tact+t1 and is monitored by the self-learning circuitry 140 on a regular basis and updated accordingly. For example, the self-learning circuitry 140 can measure the time frame (Td) since the controller 110 finishes its activity and until it gets an indication from the host for the next activity. If this time Td is much smaller (say by a threshold Ta, which can be configured by the controller 110) than the time T+t1+t2 for N number of transactions (N can be a defined number of transactions and can be associated with one or more commands), then T can be adjusted (reduced) as much as possible, provided that, in this particular embodiment, T+t1+t2>Td. Similarly, if Td>T+T1+T2, then the time T can be adjusted (increased) such that T+t1+t2>Td.

There are several alternatives that can be used with these embodiments. For example, the self-learning mechanism discussed above for adjusting an auto-sleep threshold can instead or additionally be used for adjusting a time period after which the controller performs a background operation. A background operation is in contrast to a foreground operation, which is an operation that is preferably performed to completion without being interrupted and typically has a predetermined completion time. A foreground command is typically issued by the host controller and sent to the memory system 100 for execution. Examples of a foreground command include, but are not limited to, a read command, a write command, and an erase command.

In contrast, a background operation refers to an operation that can be preempted/interrupted by a foreground command and continued at a later time. Unlike foreground commands which typically have a predetermined completion time, background commands can have an uncertain completion time, depending on how much they are interrupted by foreground commands. A background command can be performed whenever possible when no host foreground commands are currently being executed and after a period of idle time. Examples of background operations include, but are not limited to, data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks).

In the same manner as described above, if Td (the time frame since the controller 110 finishes its activity and until it gets an indication from the host for the next activity) is smaller than the time Tb+t1+t2 for N number of transactions, then Tb (the time after which a background operation can be performed) can be adjusted (reduced) as much as possible, preferably provided that Tb+t1+t2>Td. Accordingly, if Td>Tb+T1+T2, then the time T can be adjusted (increased) such that T+t1+t2>Td.

Figure 6:
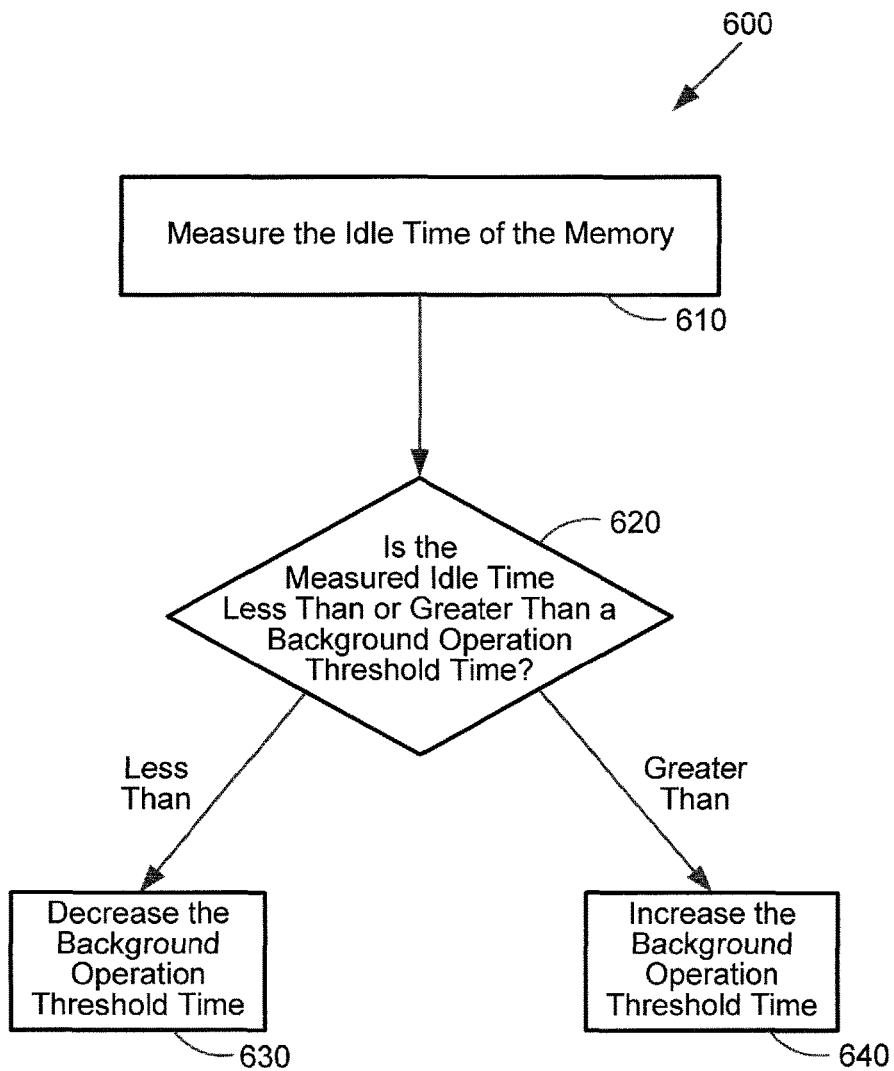
FIG. 6 is a flow chart of a method of an embodiment for adaptive background operations.

The flow chart 600 in FIG. 6 illustrates this embodiment. As shown in the flow chart 600 in FIG. 6, in performing adaptive background operations, the controller 110 measures idle time of the memory 110 (act 610) and determines if the measured idle time is less than or greater than a background operation threshold time after which the controller 110 performs a background operation (act 620). If the measured idle time is less than the threshold time, the controller 110 decreases the background operation threshold time (act 630). However, if the measured idle time is greater than the threshold time, the controller 110 increases the background operation threshold time (act 640).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:
1. A method for performing adaptive auto-sleep in a memory system, the method comprising:
performing the following in a controller of the memory system, wherein the memory system comprises a memory, and wherein the controller comprises a memory interface configured to communicate with the memory and a host interface configured to communicate with a host:
    receiving a command from the host via the host interface to perform an operation in the memory;
    receiving a signal from the memory via the memory interface indicating that the memory has completed performing the operation;
    measuring an amount of time between when the controller receives the signal from the memory via the memory interface indicating that the memory has completed performing the operation and when the controller receives a command from the host via the host interface to perform another operation in the memory; and
    comparing the measured amount of time to a sum of (a) a time period after which the controller enters an auto-sleep mode and (b) a time it takes the controller to enter and exit the auto-sleep mode; and
    adjusting the time period after which the controller enters the auto-sleep mode by:
        increasing the time period to enter the auto-sleep mode in response to the measured amount of time being greater than the sum; and
        decreasing the time period to enter the auto-sleep mode in response to the measured amount of time being less than the sum.

2. The method of claim 1, wherein the time period is adjusted based on the measured amount of time and on at least one additional amount of time for at least one additional operation.

3. The method of claim 1, wherein the time period is reduced when the measured amount of time is less than the sum by a threshold.

4. The method of claim 1, wherein the time period is increased when the measured amount of time is greater than the sum by a threshold.

5. The method of claim 1, wherein the memory is a three-dimensional memory.

6. The method of claim 1, wherein the memory system is embedded in a host.

7. The method of claim 1, wherein the memory system is removably connected to the host.

8. A memory system comprising:
    a memory; and
    a memory controller in communication with the memory, wherein the memory controller is configured to:
        measure idle time, wherein the idle time comprises an amount of time between when the memory controller receives a signal from the memory indicating that an operation is completed in the memory and when the memory controller receives a command from a host to perform another operation in the memory;
        determine if the measured idle time is less than or greater than a sum of an auto-sleep threshold and a time it takes the memory controller to enter and exit auto-sleep;
        in response to determining that the measured idle time is less than the sum, decrease the auto-sleep threshold; and
        in response to determining that the measured idle time is greater than the sum, increase the auto-sleep threshold.

9. The memory system of claim 8, wherein the memory controller is configured to measure the idle time by measuring time between when the controller receives an end signal from the memory via a memory interface and when the controller receives a start signal from the host via a host interface.

10. The memory system of claim 8, wherein the memory controller is configured to use a plurality of measured idle times to determine if the auto-sleep threshold should be increased or decreased.

11. The memory system of claim 8, wherein the memory controller is configured to measure idle time using interrupt circuitry and a clock, and wherein the memory controller is further configured to determine if the measured idle time is less than or greater than the sum using self-learning circuitry.

12. A memory system comprising:
    a memory;
    means for receiving a command from a host to perform an operation in the memory;
    means for receiving a signal from the memory indicating that the memory has completed performing the operation;
    means for measuring an amount of time between when the signal from the memory is received and when a command is received from the host to perform another operation in the memory;
    means for comparing the measured amount of time to a sum of (a) a time period after which an auto-sleep mode is entered and (b) a time it takes to enter and exit the auto-sleep mode;
    means for adjusting the time period after which the auto-sleep mode is entered by:
        increasing the time period to enter the auto-sleep mode in response to the measured amount of time being greater than the sum; and
        decreasing the time period to enter the auto-sleep mode in response to the measured amount of time being less than the sum.

13. The memory system of claim 12, wherein the time period is adjusted based on the measured amount of time and on at least one additional amount of time for at least one additional operation.

14. The memory system of claim 12, wherein the time period is reduced when the measured amount of time is less than the sum by a threshold.

15. The memory system of claim 12, wherein the time period is increased when the measured amount of time is greater than the sum by a threshold.

16. The memory system of claim 12, wherein the amount of time is measured by measuring time between when the memory system receives an end signal via a memory interface and when the memory system received a start signal via a host interface.

17. The memory system of claim 12, wherein the memory is a three-dimensional memory.

18. The memory system of claim 12, wherein the memory system is embedded in a host.

19. The memory system of claim 12, wherein the memory system is removably connected to the host.

20. A memory system comprising:
    a memory;
    means for measuring idle time, wherein the idle time comprises an amount of time between when an operation is completed in the memory and when a command is received from a host to perform another operation in the memory;

means for determining if the measured idle time of the memory is less than or greater than a sum of an auto-sleep threshold and a time it takes to enter and exit auto-sleep;

means for decreasing the auto-sleep threshold in response to determining that the measured idle time is less than the sum; and means for increasing the auto-sleep threshold in response to determining that the measured idle time is greater than the sum.

21. The memory system of claim 20, wherein the amount of time is measured by measuring time between when the memory system receives an end signal via a memory interface and when the memory system received a start signal via a host interface.

22. The memory system of claim 20, wherein the means for decreasing and the means for increasing use a plurality of measured idle times to determine if the auto-sleep threshold should be increased or decreased.

23. The memory system of claim 20, wherein idle time is measured using interrupt circuitry and a clock, and wherein the means for determining is configured to determine if the measured idle time is less than or greater than the sum using self-learning circuitry.

* * * * *